United States Patent
Lux et al.

(10) Patent No.: US 10,418,673 B2
(45) Date of Patent: Sep. 17, 2019

(54) BATTERY MODULE WITH A CONTROLLABLE EXTERNAL HEAT SINK

(71) Applicant: Bayerische Motoren Werke Aktiengesellschaft, Munich (DE)

(72) Inventors: Simon Lux, Oakland, CA (US); Max Von Groll, Palo Alto, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 15/449,375

(22) Filed: Mar. 3, 2017

(65) Prior Publication Data

US 2017/0179552 A1   Jun. 22, 2017

Related U.S. Application Data

(62) Division of application No. 14/277,436, filed on May 14, 2014, now Pat. No. 9,627,678.

(51) Int. Cl.

| | |
|---|---|
| H01M 10/63 | (2014.01) |
| H01M 2/34 | (2006.01) |
| H01M 10/655 | (2014.01) |
| H01M 10/42 | (2006.01) |
| H01M 10/625 | (2014.01) |
| H01M 10/637 | (2014.01) |
| H01M 10/657 | (2014.01) |
| H01M 10/6551 | (2014.01) |
| H01M 10/613 | (2014.01) |
| B60L 58/26 | (2019.01) |

(52) U.S. Cl.
CPC ............. *H01M 10/63* (2015.04); *B60L 58/26* (2019.02); *H01M 2/348* (2013.01); *H01M 10/4207* (2013.01); *H01M 10/613* (2015.04); *H01M 10/625* (2015.04); *H01M 10/637* (2015.04); *H01M 10/655* (2015.04); *H01M 10/657* (2015.04); *H01M 10/6551* (2015.04); *H01M 2220/20* (2013.01)

(58) Field of Classification Search
CPC .... H01M 10/63; H01M 10/42; H01M 10/613; H01M 10/625; H01M 10/6551; H01M 2/34

See application file for complete search history.

(56) References Cited

U.S. PATENT DOCUMENTS

| | | | |
|---|---|---|---|
| 6,531,847 B1 | 3/2003 | Tsukamoto et al. | |
| 2004/0004464 A1 | 1/2004 | Tsukamoto et al. | |
| 2006/0103357 A1* | 5/2006 | Johnson | B25F 5/02 320/150 |
| 2008/0118824 A1 | 5/2008 | Oguma et al. | |

(Continued)

OTHER PUBLICATIONS

Chinese Office Action issued in Chinese counterpart application No. 201580014971.4 dated Apr. 2, 2018 (Eight (8) pages).

*Primary Examiner* — Kenneth J Douyette
(74) *Attorney, Agent, or Firm* — Crowell & Moring LLP

(57) ABSTRACT

A battery module having a controllable external heat sink and methods of operating the battery module are provided. According to an aspect of the invention, the battery module includes a battery cell, an external circuit connected to the battery cell, and a controller that controls the external circuit. The external circuit includes a first switch and a heat sink. If an internal short circuit within the battery cell is detected, the controller closes the first switch in order to generate heat in the heat sink.

10 Claims, 3 Drawing Sheets

(56) References Cited

U.S. PATENT DOCUMENTS

2010/0188054 A1\* 7/2010 Asakura ............... G01R 31/025
                                                        320/161
2010/0194398 A1\* 8/2010 Kawasumi ............. H01M 2/34
                                                        324/430

\* cited by examiner

BATTERY MODULE WITH A CONTROLLABLE EXTERNAL HEAT SINK

CROSS-REFERENCE TO RELATED APPLICATIONS

This application is a divisional of prior U.S. application Ser. No. 14/277,436, filed May 14, 2014, now U.S. Pat. No. 9,627,678, the disclosure of which is expressly incorporated by reference herein.

BACKGROUND OF THE INVENTION

The present invention relates to a battery module that includes a plurality of battery cells connected to each other. If an internal short circuit is formed in one of the battery cells, the affected battery cell could become very hot, and could be permanently damaged. Further, the affected battery cell could catch on fire, and the fire could spread to the other battery cells within the battery module, causing the entire battery module to burn.

Related art systems use a variety of measures to ensure that an internal short circuit does not pose a significant safety threat to the occupants of a vehicle or the users of an electronic device that is equipped with the battery module. For example, an electronic sensor, such as a thermocouple, may be used to measure the temperature of each battery cell within the battery module. If the temperature of one of the battery cells exceeds a first threshold, the battery module is cooled, and if the temperature of one of the battery cells exceeds a second threshold that is higher than the first threshold, the battery module is turned off. However, this approach requires expensive electronic components, and may require the entire battery module to be shut down if the affected battery cell becomes too hot.

As another example, simple mechanical measures may be used to secure the battery module in the event of an internal short circuit and a subsequent thermal runaway. After the internal short circuit occurs, gas is produced as a result of the heat generated within the affected battery cell. In order to prevent an uncontrolled explosion, a breaker plate or a gas vent may be used to direct the gas away from the other battery cells. Further, the affected battery cell may be disconnected from the battery module. However, the affected battery cell is only disconnected when a significant portion of the thermal energy has already been released into the battery cell, such that it might not be possible to prevent an exothermal runaway of the battery cell.

Further, the state-of-charge window of related art battery modules is limited due to safety concerns related to potential events, such as lithium plating and overcharge events, which may trigger internal short circuits. Accordingly, it would be advantageous to provide a method of reducing the effects of an internal short circuit within a battery cell.

SUMMARY OF THE INVENTION

Exemplary embodiments of the invention provide a battery module having a controllable external heat sink, and methods of operating the battery module. According to an aspect of the invention, a battery module is provided. The battery module includes a battery cell; an external circuit connected to the battery cell, wherein the external circuit comprises a first switch and a heat sink; and a controller that controls the external circuit. If an internal short circuit within the battery cell is detected, the controller closes the first switch in order to generate heat in the heat sink.

The internal short circuit may be detected if a voltage of the battery cell is below a voltage threshold. Further, the internal short circuit may be confirmed based on a current of the battery cell.

If the internal short circuit is detected, the controller may isolate the battery cell from a plurality of other battery cells within the battery module. If the internal short circuit is detected, the controller may open a second switch of the external circuit in order to interrupt a bus current to the battery cell. Further, if the internal short circuit is detected, the controller may interrupt the bus current to a plurality of other battery cells within the battery module.

A resistance of the heat sink may be smaller than a resistance of a dendrite causing the internal short circuit. Alternatively, a resistance of the heat sink may be approximately equal to or greater than a resistance of a dendrite causing the internal short circuit.

After the internal short circuit is detected, the controller may maintain the first switch in a closed state until a temperature of the battery cell is below a temperature threshold. After the first switch is closed, more heat may be generated in the heat sink than in the battery cell.

According to another aspect of the invention, a method of operating a battery module is provided. The method includes detecting an internal short circuit within a battery cell of the battery module and closing a first switch within an external circuit connected to the battery cell in order to generate heat in a heat sink within the external circuit.

The internal short circuit may be detected if a voltage of the battery cell is below a voltage threshold. The method may also include confirming the internal short circuit based on a current of the battery cell.

In addition, the method may include isolating the battery cell from a plurality of other battery cells within the battery module. The method may also include opening a second switch within the external circuit in order to interrupt a bus current to the battery cell. Further, the method may include interrupting the bus current to a plurality of other battery cells within the battery module.

A resistance of the heat sink may be smaller than a resistance of a dendrite causing the internal short circuit. Alternatively, a resistance of the heat sink may be approximately equal to or greater than a resistance of a dendrite causing the internal short circuit.

The method may also include maintaining the first switch in a closed state after the internal short circuit is detected, until a temperature of the battery cell is below a temperature threshold. After the first switch is closed, more heat may be generated in the heat sink than in the battery cell.

According to yet another aspect of the invention, a non-transitory computer-readable medium including computer instructions executable by a processor to cause the processor to perform the methods discussed above is provided.

Other objects, advantages, and novel features of the present invention will become apparent from the following detailed description of the invention when considered in conjunction with the accompanying drawings.

DETAILED DESCRIPTION OF EXEMPLARY EMBODIMENTS

Figure 1:
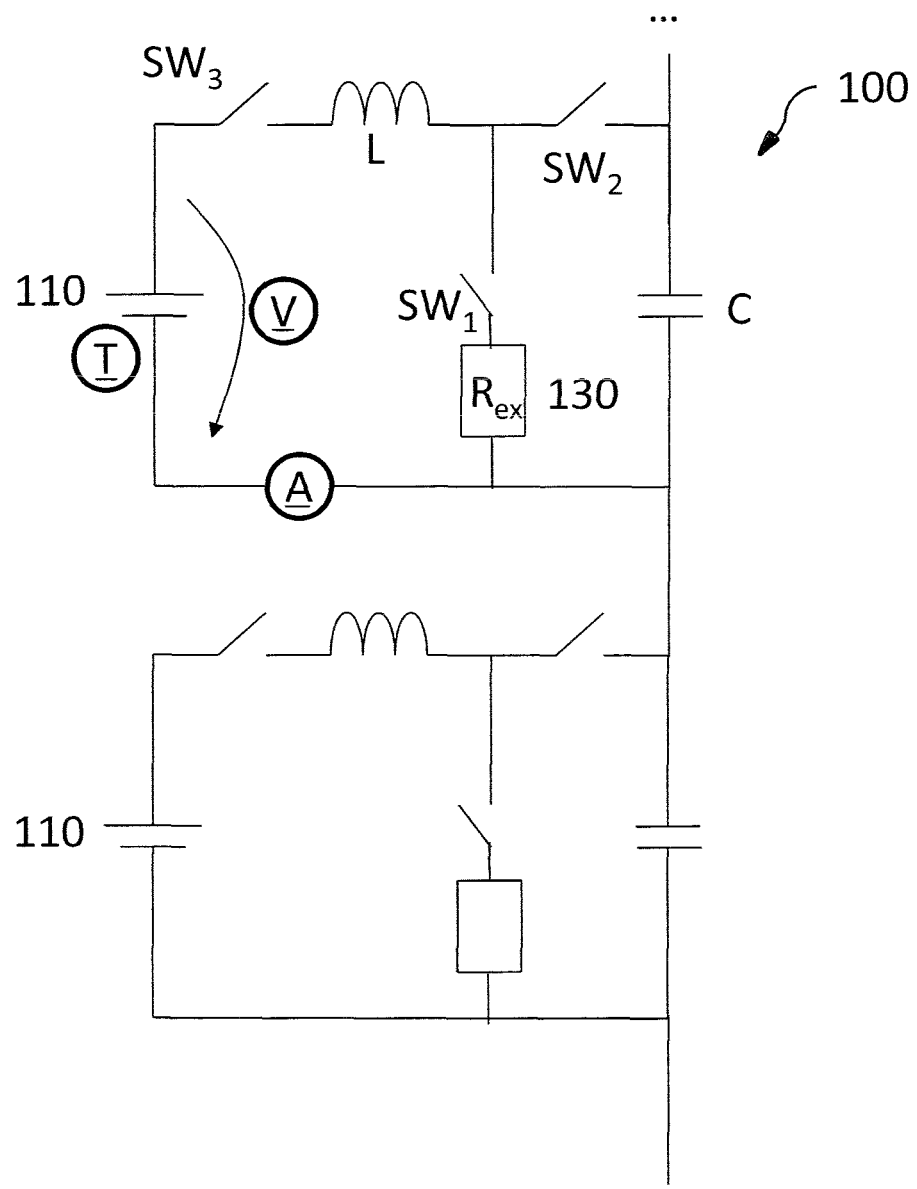
FIG. 1 shows a block diagram of an exemplary embodiment of a battery module.

FIG. 1 shows a block diagram of an exemplary embodiment of a battery module. As shown in FIG. 1, the battery module 100 includes a plurality of battery cells 110, each of which is equipped with an external circuit. For example, a battery module 100 for an electric vehicle may include hundreds or thousands of battery cells 110, whereas a battery module 100 for an electric bicycle may include fewer than one hundred battery cells 110. The battery cells 110 may be lithium-ion cells, or may have any other suitable chemistry.

As shown in FIG. 1, each external circuit may be a DC/DC converter, and may include a first switch $SW_1$, a second switch $SW_2$, and a third switch $SW_3$, which are controlled by a respective controller (not shown). Each external circuit may also include an inductor L and a capacitor C. In addition, each external circuit may include a voltage sensor V that measures the voltage of the respective battery cell 110, a temperature sensor T that measures the temperature of the respective battery cell 110, and a current sensor A that measures the current of the respective battery cell 110. Measurement results from these sensors are output to the controller. In a typical operating mode, the third switch $SW_3$ is continuously closed, while the controller controls the first switch $SW_1$ and the second switch $SW_2$ to alternate very quickly between open and closed, such that when the first switch $SW_1$ is open the second switch $SW_2$ is closed, and vice versa.

Figure 2:
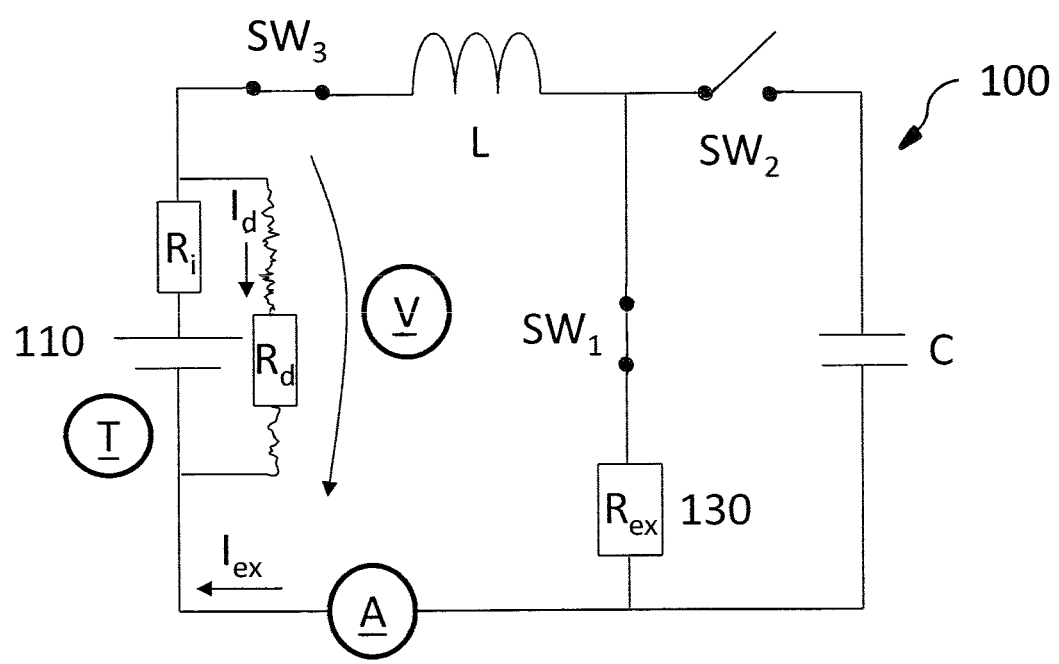
FIG. 2 shows an exemplary embodiment in which an internal short circuit has occurred within a battery cell, such that a dendrite links the anode and the cathode.

FIG. 2 shows an exemplary embodiment in which an internal short circuit has occurred within one of the battery cells 110. For example, a dendrite may grow from the anode to the cathode of the battery cell 110. This dendrite has a resistance $R_d$ through which a current $I_d$ flows. The battery cell 110 also has an internal resistance $R_i$, which is typically in the range of 1-20 mΩ for a lithium-ion cell, but may be smaller or larger depending on the size, format, and specific storage chemistry of the battery cell 110. The dendrite resistance $R_d$ is usually much smaller than the internal resistance $R_i$. As discussed in further detail below, in order to reduce the effects of the internal short circuit, a heat sink 130 with a resistance $R_{ex}$ is provided external to the battery cell 110. A current $I_{ex}$ flows through the heat sink 130.

Figure 3A:
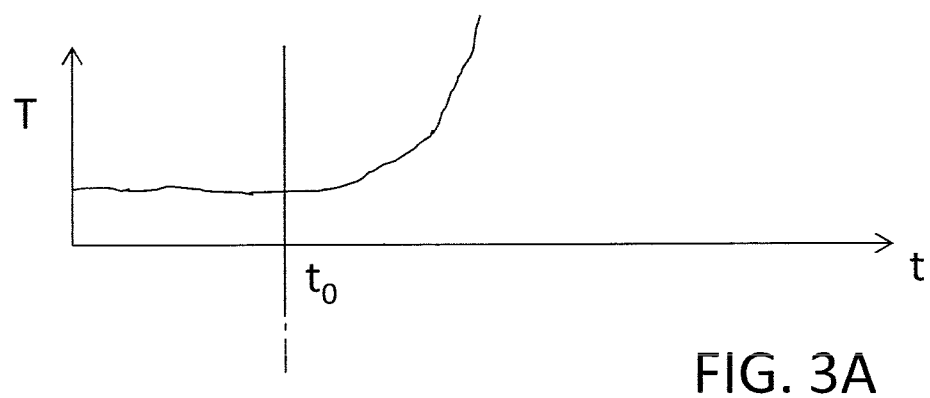
FIGS. 3A and 3B show measurements of characteristics of the battery cell during, before, and after the internal short circuit.
Figure 3B:
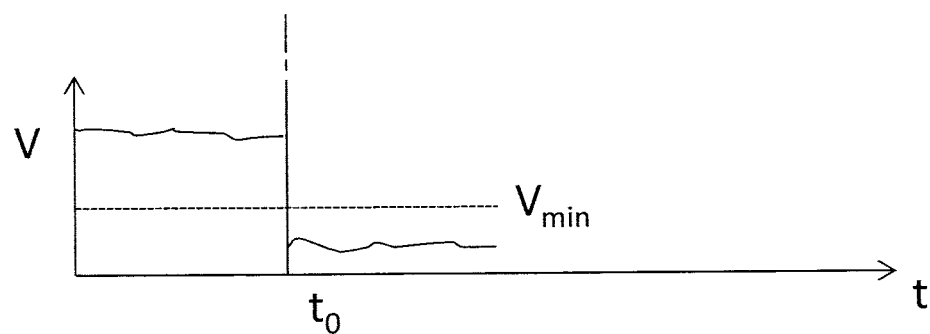

FIGS. 3A and 3B show measurements of characteristics of the battery cell 110 during, before, and after the internal short circuit. FIG. 3A shows temperature measurements from the temperature sensor T, and FIG. 3B shows voltage measurements from the voltage sensor V. In FIGS. 3A and 3B the internal short circuit begins at time $t_0$. The internal short circuit may be detected by any suitable method. For example, as shown in FIG. 3B, the internal short circuit may be indicated by a fast voltage drop to a voltage that is below a threshold voltage $V_{min}$. The threshold voltage $V_{min}$ may be defined as an absolute value or as a percentage of the voltage in a normal operating state before the internal short circuit. The existence of the internal short circuit may be verified by checking the current of the battery cell 110. The internal short circuit may trigger an initial spike in the current. After the initial spike, the current becomes approximately zero, and remains approximately zero while the internal short circuit remains. Accordingly, the existence of the internal short circuit may be confirmed by measuring a current that is approximately zero.

FIG. 3A shows that once the internal short circuit begins at time $t_0$, the temperature of the battery cell 110 increases rapidly. Upon detecting the internal short circuit, the controller generates an external short circuit by closing the first switch $SW_1$ and the third switch $SW_3$. The controller may be a processor, or simple diode-transistor circuits that close the first switch $SW_1$ and the third switch $SW_3$ if the cell voltage drops below the threshold voltage $V_{min}$. This causes at least some of the heat to be generated in the heat sink 130 instead of the battery cell 110. The controller may also open the second switch $SW_2$ in order to interrupt the bus current to the battery cell 110. The controller may maintain the switches in this configuration until the temperature of the battery cell 110 falls below a temperature threshold. The temperature threshold may be any suitable value, such as between 50 and 60° C., and may depend on the chemistry and the size format of the battery cell 110.

The resistance $R_{ex}$ of the heat sink 130 may be determined in any suitable manner. For example, the ratio of the heat $P^L_{ex}$ generated within the heat sink 130 to the heat $P^L_{Cell}$ generated within the battery cell 110 may be derived as follows:

$$V_{cell} = (Z_L + R_{ex}) \cdot I_{ex} \quad (1)$$

$$V_{cell} = R_d \cdot I_d \quad (2)$$

Here $V_{cell}$ is the voltage of the battery cell 110 and $Z_L$ is the impedance of the inductor L. In Equation (1) the second switch $SW_2$ is open.

$$P^L_{ex} = I_{ex} \cdot V_{cell} = \frac{V^2_{cell}}{Z_L + R_{ex}} \quad (3)$$

$$P^L_{Cell} = I_d \cdot V_{cell} = \frac{V^2_{cell}}{R_d} \quad (4)$$

$$Z_L = j\omega \quad (5)$$

Assuming a steady state response, the frequency ω is approximately zero in Equation (5), such that the impedance $Z_L$ of the inductor L is approximately zero. Accordingly, Equations (3) and (4) may be solved as follows:

$$\frac{P^L_{ex}}{P^L_{Cell}} = \frac{R_d}{R_{ex}} \quad (6)$$

The resistance $R_d$ of the dendrite depends on various factors, such as the chemistry of the battery cell 110. The resistance $R_{ex}$ of the heat sink 130 may be selected such that the ratio shown in Equation (6) is approximately one. In this embodiment, the resistance $R_{ex}$ of the heat sink 130 is selected to be approximately equal to the resistance $R_d$ of the dendrite. Alternatively, the resistance $R_{ex}$ of the heat sink 130 may be selected to be smaller than the resistance $R_d$ of the dendrite, in order to generate more heat in the heat sink 130 than the battery cell 110. However, even an external resistance $R_{ex}$ that is greater than the resistance $R_d$ of the dendrite has a safety advantage compared to a system without such a measure, because less heat will be generated in the battery cell 110 in the event of an internal short circuit.

As discussed above, when the internal short circuit is detected, the controller may open the second switch $SW_2$ in order to interrupt the bus current to the battery cell 110. This isolates the affected battery cell 110 from the other battery cells within the battery module 100. If the heat generated by the internal short circuit is not too dangerous, the other battery cells may be allowed to continue operating. In this case a vehicle or an electronic device equipped with the battery module 100 may continue to run. On the other hand, if the heat generated by the internal short circuit is not small enough to be safe, then the bus current to the other battery cells may also be interrupted, such that the vehicle or the electronic device loses power and stops running.

By reducing the amount of heat that is generated within a battery cell during an internal short circuit, the battery module according to exemplary embodiments of the invention may prevent or reduce the risk of a thermal runaway of the battery cell. This reduces the risk of fire in the battery cell and the battery module, thereby improving the safety of the battery module. In addition, the state-of-charge window of the battery module may be extended, due to the increased reliability of the battery module.

According to another exemplary embodiment of the invention, there is provided a non-transitory computer-readable medium encoded with a computer program for operating a battery module. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a battery module, the method comprising:

detecting an internal short circuit within a battery cell of the battery module in response to a voltage of the battery cell being below a voltage threshold;

confirming, separately from said detecting, the existence of the internal short circuit based on a current of the battery cell; and closing, in response to said detecting and confirming the internal short circuit, a first switch within an external circuit connected to the battery cell in order to generate heat in a heat sink within the external circuit.

2. The method according to claim 1, further comprising isolating the battery cell from a plurality of other battery cells within the battery module.

3. The method according to claim 1, further comprising opening a second switch within the external circuit in order to interrupt a bus current to the battery cell.

4. The method according to claim 3, further comprising interrupting the bus current to a plurality of other battery cells within the battery module.

5. The method according to claim 1, wherein a resistance of the heat sink is smaller than a resistance of a dendrite causing the internal short circuit.

6. The method according to claim 1, wherein a resistance of the heat sink is equal to or greater than a resistance of a dendrite causing the internal short circuit.

7. The method according to claim 1, further comprising maintaining the first switch in a closed state after the internal short circuit is detected, until a temperature of the battery cell is below a temperature threshold.

8. The method according to claim 1, wherein after the first switch is closed, more heat is generated in the heat sink than in the battery cell.

9. The method according to claim 1, wherein confirming the existence of the internal short circuit comprises confirming the existence of the internal short circuit when the current of the battery cell is measured as zero.

10. The method according to claim 1, wherein the threshold voltage is an absolute value or a percentage of voltage in a normal operating state before the detected internal short circuit.

* * * * *